Patented July 4, 1950

2,513,570

UNITED STATES PATENT OFFICE 2,513,570

METHYL-SUBSTITUTED 2-THENOYL-o-BENZOIC ACIDS

Henry R. Lee and Viktor Weinmayr, Pitman, N. J., assignors to E. I. du Pont de Nemours & Company, Wilmington, Del., a corporation of Delaware No Drawing. Application January 22, 1947, Serial No. 723,666

3 Claims. (Cl. 260—329)

This invention relates to the preparation of methyl-substituted (2-thenoyl)-o-benzoic acids of the general formula:

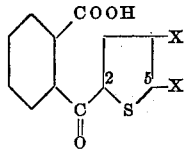

wherein one X stands for a methyl group while the other X stands for hydrogen.

The invention has for its object the preparation of new intermediates particularly suitable for the preparation of new dyestuffs. A further object of the invention is to provide a commercially feasible process for the preparation of these new intermediates.

These methyl-substituted (2-thenoyl)-o-benzoic acids are valuable intermediates for use in organic synthesis and are of special importance as intermediates in the preparation of dyes because they can be readily ring-closed to the corresponding 2-methylthiophanthraquinone and the 3-methylthiophanthraquinone, as more particularly described in our co-pending application Serial No. 723,668.

These methyl-substituted (2-thenoyl)-o-benzoic acids may be obtained in good yields by condensing alpha-methylthiophene or beta-methylthiophene with phthalic anhydride where the reaction is carried out in nitrobenzene and in the presence of aluminum chloride at temperatures of above 50° C.

The following examples are given to illustrate a preferred process for the preparation of these compounds.

Example 1

150 parts of aluminum chloride and 74 parts of phthalic anhydride were dissolved in 450 parts of nitrobenzene and the solution was heated to 78° C. A solution of 49 parts of alpha-methyl thiophene in 90 parts of nitrobenzene was added while the mass was held at from 78° to 85° C. over a period of one hour. When the HCl evolution had stopped, the mass was poured into water and the nitrobenzene was removed by steam distillation. The crude reaction product was dissolved in 800 parts of water containing a slight excess of caustic soda over that required to neutralize the solution, and filtered. The filtrate was acidified with hydrochloric acid and the crystalline precipitate was filtered, washed and dried.

106 parts of crude (5-methyl-2-thenoyl)-o-benzoic acid, melting at from 128° to 132° C., were obtained, equal to a yield of 86.2% of theory. It was purified to a melting point of 133° C. by crystallizing from about 8 parts of benzene per part of (5-methyl-2-thenoyl)-o-benzoic acid.

Example 2

300 parts of anhydrous aluminum chloride and 148 parts of phthalic anhydride were dissolved in 830 parts of nitrobenzene and heated to 79° C. There was then added over a period of 30 minutes 98 parts of beta-methylthiophene dissolved in 168 parts of nitrobenzene, while the temperature of the mass was maintained at from 79° to 85° C. The charge was agitated at from 80° to 85° C. for 2.5 hours after the addition of thiophene had been completed, and was then worked up as in Example 1.

191 parts of crude (4-methyl-2-thenoyl)-o-benzoic acid was obtained, melting at from 128° to 132° C., equal to a yield of 78% of theory. Crystallization from about 6 parts of benzene per part of crude keto acid gave pure (4-methyl-2-thenoyl)-o-benzoic acid melting at from 134° to 135° C.

While the specific process as above described may be varied, it has been found that the phthalic anhydride and the methylthiophenes may be employed in substantially equal molecular amounts and that from 10% to 15% in excess of 2 mols of aluminum chloride (AlCl₃) per mol of phthalic anhydride gives maximum yields of the desired product. The excess aluminum chloride is employed to assure complete condensation and to make up for any impurities which may be present therein. While other solvents customarily employed in the Friedel-Crafts reaction may be used, nitrobenzene has been found most satisfactory. The condensation temperatures may be varied, but temperatures below 50° C. adversely influence the yield, apparently due to polymerization of the methylthiophene. Temperatures of from 70° to 90° C. have been found to give satisfactory results. The (methyl-2-thenoyl)-o-benzoic acids may be isolated and purified as described, or, where desired, they may be ring-closed in the nitrobenzene solution without isolation.

We claim:

1. The (methyl-2-thenoyl)-o-benzoic acids of the formula:

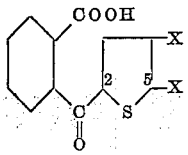

wherein one X stands for a methyl group while the other X stands for hydrogen.

2. (5-methyl-2-thenoyl)-o-benzoic acid.
3. (4-methyl-2-thenoyl)-o-benzoic acid.

HENRY R. LEE.
VIKTOR WEINMAYR.

REFERENCES CITED

The following references are of record in the file of this patent:

Bernthsen and Sudborough: "Organic Chemistry," page 549, Van Nostrand, N. Y., 1925 (1922 edition).

Thomas: "Anhydrous Aluminum Chloride," pages 524, 525, 540, 541, Reinhold Pub. Co., N. Y., 1941.